United States Patent
Brossier et al.

(10) Patent No.: US 8,945,674 B2
(45) Date of Patent: Feb. 3, 2015

(54) METHOD FOR FORMING A PROTECTIVE COATING CONTAINING ALUMINIUM AND ZIRCONIUM ON A METAL PART

(75) Inventors: Jerome Brossier, Evry-Cergy sur Yerres (FR); Yannick Cadoret, Suresnes (FR); Justine Menuey, Chatellerault (FR); Annie Pasquet, Longjumeau (FR)

(73) Assignee: SNECMA, Paris (FR)

(*) Notice: Subject to any disclaimer, the term of this patent is extended or adjusted under 35 U.S.C. 154(b) by 681 days.

(21) Appl. No.: 12/922,600

(22) PCT Filed: Mar. 13, 2009

(86) PCT No.: PCT/EP2009/053009
§ 371 (c)(1),
(2), (4) Date: Sep. 14, 2010

(87) PCT Pub. No.: WO2009/112581
PCT Pub. Date: Sep. 17, 2009

(65) Prior Publication Data
US 2011/0014370 A1    Jan. 20, 2011

(30) Foreign Application Priority Data
Mar. 14, 2008 (FR) ..................... 08 01422

(51) Int. Cl.
C23C 10/00 (2006.01)
C23C 10/14 (2006.01)

(52) U.S. Cl.
CPC . C23C 10/14 (2013.01); Y02T 50/67 (2013.01)
USPC .......................................... 427/226

(58) Field of Classification Search
USPC .......................................... 427/226
See application file for complete search history.

(56) References Cited

U.S. PATENT DOCUMENTS

| | | | | |
|---|---|---|---|---|
| 4,936,927 | A * | 6/1990 | Grunke et al. | 148/549 |
| 6,585,864 | B1 * | 7/2003 | Fisher et al. | 204/192.16 |
| 6,689,422 | B1 | 2/2004 | Warnes et al. | |
| 2004/0037958 | A1 | 2/2004 | Warnes et al. | |
| 2004/0038069 | A1 | 2/2004 | Warnes et al. | |
| 2004/0194858 | A1 * | 10/2004 | Bacos et al. | 148/240 |

FOREIGN PATENT DOCUMENTS

EP    1 466 996    10/2004

OTHER PUBLICATIONS

U.S. Appl. No. 13/496,804, filed Mar. 16, 2012, Brossier, et al.
U.S. Appl. No. 13/473,200, filed May 16, 2012, Carlin, et al.

* cited by examiner

Primary Examiner — Robert Vetere
(74) Attorney, Agent, or Firm — Oblon, Spivak, McClelland, Maier & Neustadt, L.L.P.

(57) ABSTRACT

A method for forming a protective coating containing aluminum and zirconium on the surface of a metal part. The part is put into contact with a cement made of aluminum alloy, at a treatment temperature, with an atmosphere containing an active gas which reacts with the cement to form a gaseous aluminum halide, which decomposes in contact with the part depositing metallic aluminum thereon, the active gas containing $ZrOCl_2$ that decomposes in contact with the part depositing Zr metal thereon, and being formed by vaporizing granules of $ZrOCl_2$ that are solid at ambient temperature. The part, the cement, and $ZrOCl_2$ granules are then progressively heated together in a chamber from ambient temperature to the treatment temperature with a plateau at 400° C.±200° C.

14 Claims, 3 Drawing Sheets

METHOD FOR FORMING A PROTECTIVE COATING CONTAINING ALUMINIUM AND ZIRCONIUM ON A METAL PART

The present invention relates to the deposition of a protective coating based on aluminium on a metal part. It relates more particularly to the application of such a coating to parts of a turbine, notably a gas turbine engine.

A gas turbine engine, such as used for propulsion in the aeronautical field, comprises an atmospheric air inlet that communicates with one or more compressors, one of which being generally a fan, driven in rotation about the same axis. The primary flow of this air, after it has been compressed, feeds a combustion chamber disposed annularly about this axis and is mixed with fuel to provide hot gases downstream of one or more turbines through which these are expanded, the turbine rotors driving the compressor rotors. An attempt is made for the temperature of the engine gases at the inlet at which the turbine engines operate to be as high as possible since performance is linked to it. With this objective, the materials are selected to resist the operating conditions, and the walls of the parts swept by the hot gases, such as the distributors or moving turbine blades, are provided with cooling means. In addition, by reason of their metallic constitution made of a superalloy based on nickel or cobalt, it is also necessary to protect these against erosion and corrosion brought about by the constituents of the engine gases at these temperatures.

A known means for ensuring protection of these parts is to deposit an aluminium based coating on surfaces liable to be attacked by the gases. Aluminium is attached to the substrate by metallic inter-diffusion and forms a protective oxide layer on the surface. The thickness of the coating is of the order of a few tens of microns.

The present invention relates to a technique, known in itself, of depositing aluminium in the vapour phase, also called aluminization, by vapour phase deposition. According to the method, parts to be treated are placed in a semi-sealed chamber in which the atmosphere consists of a mixture of an inert or reducing gas, for example argon or hydrogen, and an active gas comprising aluminium halide. At the reaction temperature, between 900° C. and 1150° C., the halide decomposes at the surface of the metal into gaseous halogen and aluminium that diffuses into the metal.

The halide is produced by placing a cement in a chamber with the parts to be treated, which cement is a donor of metallic aluminium or a metallic alloy of aluminium with one or more metallic constituents, notably chromium, of the material forming the parts to be protected, in the presence of granules of a compound of a halogen, chlorine or fluorine, that form the activator. Inert gas is made to circulate over the activator at a temperature that enables the halide to sublime that is entrained on the donor and with which it reacts to produce metallic halide, which at this temperature, is in vapour form.

Since the activator should be gaseous at the temperature of the coating and should not produce contaminants, products are generally chosen such as ammonium chloride, ammonium fluoride or ammonium bifluoride. In the presence of hydrogen or in a neutral gas at a high temperature, these molecules decompose into ammonia and halogen. The vaporization temperature depends on the nature of the chosen halogenated salt. For example, it is 340° C. for ammonium chloride. The activator is only used for conveying a halogenated acid completely safely into the reactor where deposition is to be carried out, that is to say the semi-sealed container. The cation linked to this halogen (here ammonium) is consequently of no value.

The halide then decomposes in contact with the metal substrate to be coated, enabling aluminium to be deposited. A cyclic process is established during aluminization for the deposition of aluminium that proceeds continuously until the aluminium activity on the surface of the substrate becomes equal to that imposed by the cement. Gaseous halogen is reformed. The coating obtained possibly serves as an intermediate layer between the metal substrate and a protective thermal barrier for this substrate on which it has been applied. The coating makes it possible to improve the strength of the thermal barrier on the substrate as well as the capacity of the latter to preserve the characteristics in use in case of heat degradation of the thermal barrier.

In addition, the favourable effect of zirconium is known on the adhesion of an oxide layer on a metal substrate, whether this layer be formed by exposure to air at a high temperature or by deposition of a thermal barrier.

In patent FR 2853329, a vapour phase aluminization method is described that is modified so as to enable aluminium and zirconium to be co-deposited. The ammonium halide of the conventional APVS method is at least partly replaced by a zirconium compound, the presence of which is desired to be seen in a trace state in the deposit.

Among the zirconium salts capable of performing the role of an activator, mention made be made in a non-limiting manner, of zirconium chloride $ZrCl_4$, zirconium oxychloride $ZrOCl_2$ and ammonium fluozirconate $(NH_4)_2ZrF_6$. All these salts are gaseous above 250° C. Zirconium oxychloride is the preferred activator.

The deposition principle remains identical to that of the APVS method. The cement based on aluminium or an alloy of aluminium and notably chromium, is placed in the form of grains with a diameter between 1 mm and a few cm in a suitable semi-sealed container. The parts to be coated are arranged so as to be put into contact with the gaseous aluminium halide formed. The ammonium halide activator is entirely or partly replaced by zirconium oxychloride. The chamber in which the container is placed is heated to the APVS treatment temperature. Above a certain temperature, the activator evaporates and forms a vapour rich in zirconium chloride. The latter decomposes at the surface of the substrate made of a nickel or cobalt superalloy to form zirconium in the metallic state on the one hand, and on the other hand a halogenated acid available to form an aluminium halide in the donor cement. Zirconium deposited at the surface of the substrate then diffuses into the beta-NiAl coating being formed to give an intermetallic compound enriched with between 300 and 1000 ppm (parts per million) of zirconium in the deposit.

The invention relates to an improved vapour deposition aluminization method of this type with co-deposition of zirconium, notably making it possible to control the Zr concentration in the deposit.

The method of the invention for forming a protective coating of aluminium and zirconium on the surface of a metal part comprises putting said part into contact with a cement made of aluminium alloy, at a treatment temperature, with an atmosphere containing an active gas which,
    on the one hand reacts with the cement to form a gaseous aluminium halide, which decomposes in contact with the part depositing metallic aluminium thereon,
    on the other hand contains $ZrOCl_2$ that decomposes in contact with the part depositing zirconium metal thereon, and is formed by vaporizing granules of $ZrOCl_2$ that are solid at ambient temperature.

The method is characterized by the fact that the part, the cement and $ZrOCl_2$ granules are progressively heated together in a chamber from ambient temperature to the treatment temperature with a plateau at 400° C.±200° C. or more particularly 500±100°.

Preferably, the duration of the heating plateau is 5 to 30 minutes, and heating is carried out progressively at a rate of temperature rise between 4 and 20° C. per minute.

The advantage of the method of the invention is that of controlling the quantity of zirconium deposited. On the one hand, the plateau permits good homogenization of the atmosphere in zirconium with complete chemical reactions, and on the other hand the rapid temperature rise after decomposition enables aluminium and zirconium to be deposited simultaneously.

According to a variant, a halogen or an ammonium halide is added to the chamber: $NH_4Cl$, $NH_4F$ and $NH_4F$, HF. In this case, it is necessary to ensure that the $ZrOCl_2/NH_4F$ ratio is for example within a ratio of 1 to 20.

The part contains at least nickel which combines with aluminium to form an NiAl intermetallic compound in which aluminium is partially substituted by zirconium. More particularly, the part is made of a superalloy based on nickel or cobalt.

Preferably, the cement made of aluminium alloy contains chromium. The alloy preferably additionally contains 20% to 30% aluminium.

The atmosphere is formed, apart from the active gas, of an inert or reducing gas such as argon or hydrogen and the treatment temperature lies between 950 and 1200° C. and preferably approximately 1080° C.

The method is particularly advantageous in the case where an aluminized sub-layer is formed of a thermal barrier such as that formed according to the technique presented for example in patent EP 1 473 378.

Aluminium at the interface of the thermal barrier combines with oxygen to form alumina which, when the layer is too thick, weakens the adhesion of the thermal barrier to the sub-layer. Zirconium in the sub-layer at the metal oxide interface slows the growth of the alumina layer and in this way promotes adhesion of the ceramic layer.

Other features and advantages will become apparent from the following description with reference to the appended figures.

As has been reported above, the method advantageously applies to the treatment of moving turbine blades or the distributor vanes.

An aluminium donor cement, consisting of a chromium-aluminium alloy, is placed with the parts to be treated in a container, itself placed in a closed chamber so as to be able to operate in a controlled atmosphere. A cement is used having 30% aluminium. Other aluminium contents make it possible to obtain coatings with various structures and various thicknesses.

Zirconium oxychloride was also placed, forming the activator, which is solid at ambient temperature, in a proportion relative to the cement of a few percent, more precisely between 0.1 and 5%.

The chamber is then purged before introducing the gas constituting the initial atmosphere, argon or hydrogen.

The treatment cycle comprises a first heating plateau, as may be seen on the appended graph. The temperature rise is progressive. According to the invention, the temperature rise rate lies between 4 and 20° C. per minute. When the temperature reaches approximately 500° C., this is kept constant for a period of between 5 and 30 minutes so as to ensure vaporization of the zirconium oxychloride granules. The temperature rise after decomposition is determined so as to ensure the zirconium deposit as well as that of aluminium.

When the chamber reaches the aluminization treatment temperature, of between 1080° C. and 1180° C., this is held for 4 to 16 hours so as to enable aluminium to be deposited and to diffuse into the part. At the same time, the zirconium deposit is produced so as to form a superficial layer. Zirconium is concentrated in the first layer.

Figure 1:
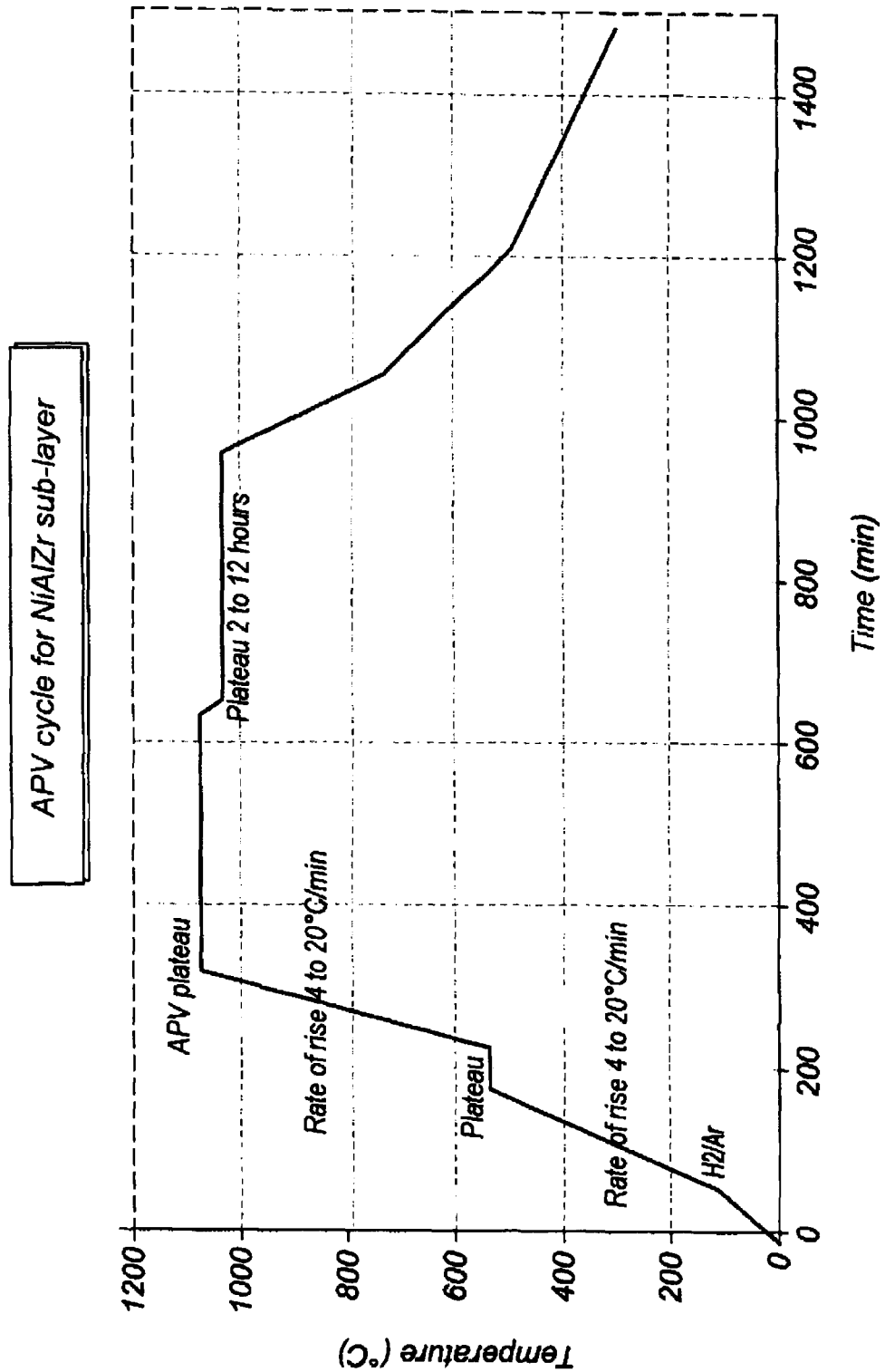
FIG. 1 is a graph representing the temperature changes of a method according to the invention.
Figure 2:
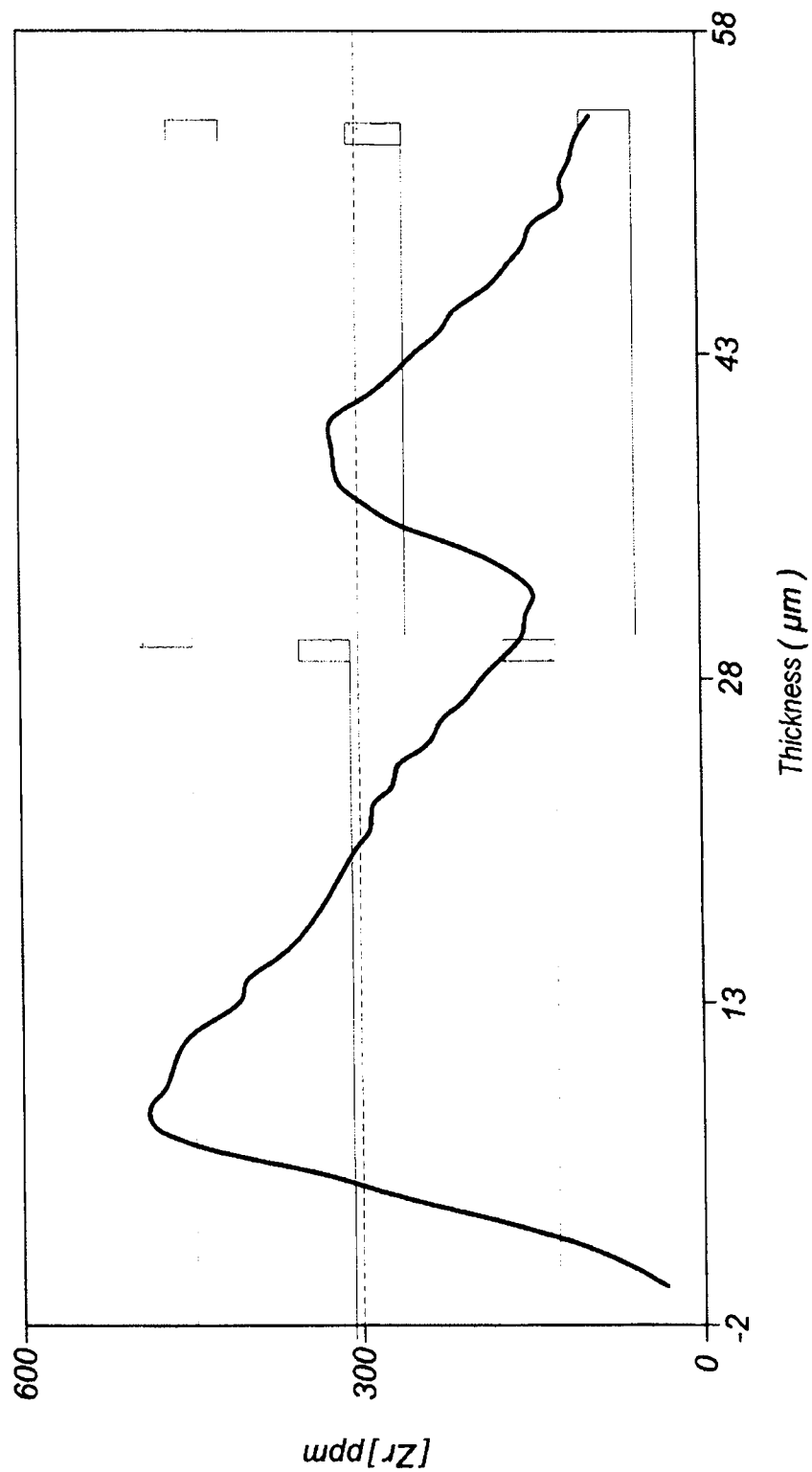
FIGS. 2 and 3 are two graphs showing two examples of changes to the zirconium content as a function of the thickness of the aluminized layer.
Figure 3:
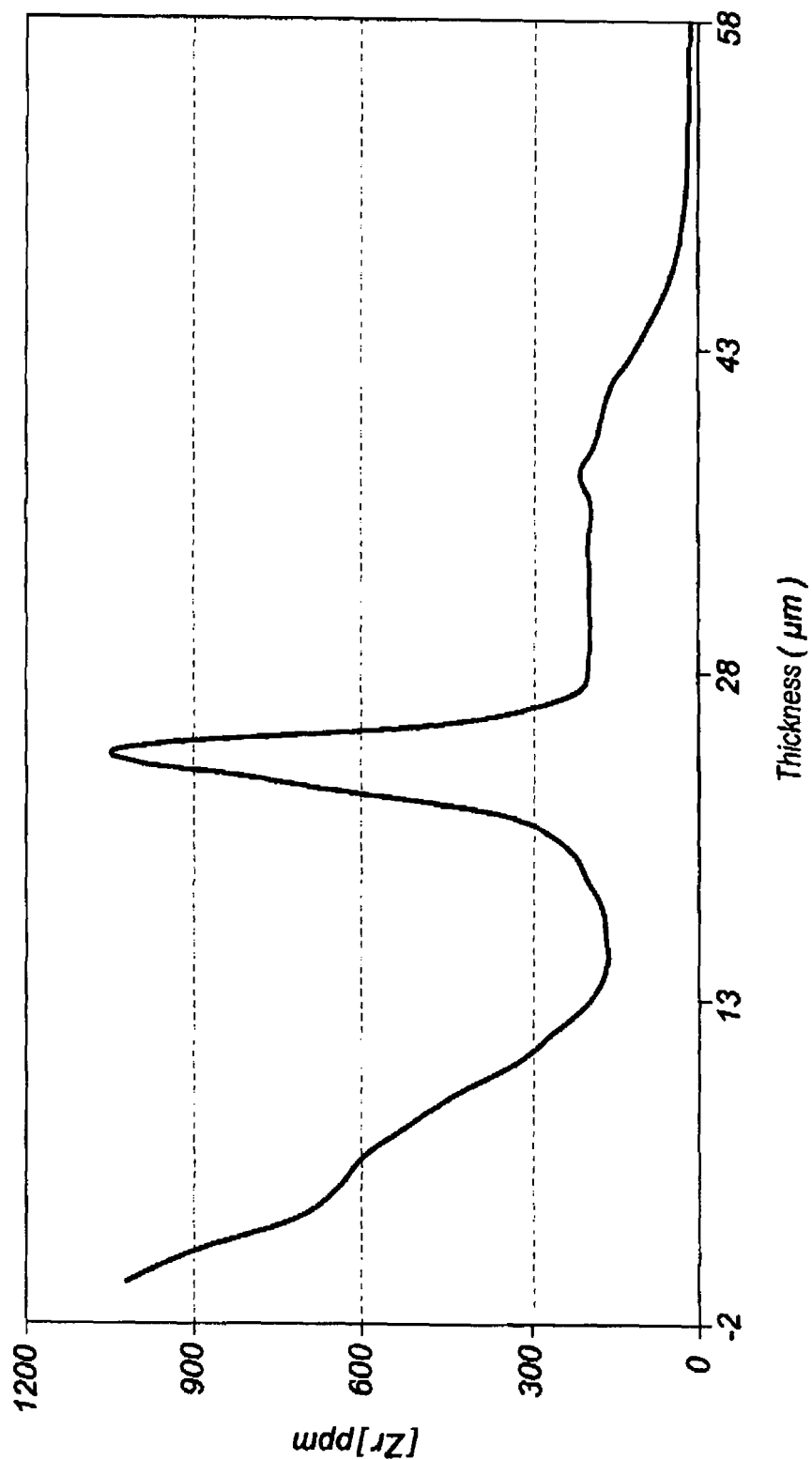

Two examples of Zr concentration, given in ppm, are shown in FIGS. 2 and 3, according to the thickness given in µm, from the surface of the part treated according to the invention. Concentration changes are a function of parameters such as the quantity of activator, the atmosphere, the temperature of the plateau and temperature rise rate. In both cases, a zirconium concentration peak is observed that may be situated at various places in the thickness of the aluminized layer according to the above parameters.

The invention claimed is:

1. A method for forming a protective coating containing aluminium and zirconium on a surface of a metal part, the method comprising:

placing the part, a cement made of aluminium alloy, and granules of $ZrOCl_2$ in a chamber;

applying a treatment temperature to the chamber to form an atmosphere comprising an active gas which reacts with the cement to form a gaseous aluminium halide, which decomposes in contact with the part depositing metallic aluminium thereon, the active gas comprising $ZrOCl_2$ that decomposes in contact with the part depositing Zr metal thereon, and being formed by vaporizing the granules of $ZrOCl_2$ that are solid at ambient temperature, wherein during the treatment, the part, the cement, and the $ZrOCl_2$ granules are progressively heated together, in the chamber, from ambient temperature to a temperature with a plateau at 400° C.±200° C., the heating plateau lasting 5 to 30 minutes during which the vaporized granules of $ZrOCl_2$ are distributed in the atmosphere, and wherein a concentration of Zr deposited on the metal part is controlled by adjustment of a quantity of the $ZrOCl_2$ relative to the donor cement placed in the deposition chamber, adjustment of the atmosphere of the chamber, and at least one parameter selected from the group consisting of adjustment of the temperature of the plateau and adjustment of a rate of heating the chamber from the plateau to the aluminization treatment temperature.

2. The method according to claim 1, wherein the plateau is at a temperature of 500° C.±100° C.

3. The method according to claim 1, wherein heating is carried out progressively at a temperature rise rate of between 4° C. and 20° C. per minute.

4. The method according to claim 2, wherein heating is carried out progressively at a temperature rise rate of between 4° C. and 20° C. per minute.

5. The method according to claim 1, wherein the active gas additionally contains at least one ammonium halide.

6. The method according to claim 5, wherein the ratio of $ZrOCl_2$ to ammonium halide is greater than 1/1 and is less than 20/1.

7. The method according to claim 1, wherein the part contains at least nickel which combines with aluminium to form an intermetallic compound NiAl in the coating in which aluminium is partially substituted by zirconium.

8. The method according to claim 7, wherein the part is a superalloy based on nickel or cobalt.

9. The method according to claim 1, wherein the active gas contains at least one halogen.

10. The method according to claim 1, wherein the aluminium alloy contains chromium.

11. The method according to claim 1, wherein the atmosphere is formed, apart from the active gas, of an inert or reducing gas.

12. The method according to claim 11, wherein the inert gas is argon and the reducing gas is hydrogen.

13. The method according to claim 1, wherein the treatment temperature lies between 950 and 1200° C. or is approximately 1080° C.

14. The method according to claim 1, wherein the concentration of Zr is less than 1200 ppm.

* * * * *